(12) United States Patent
Sivertsen et al.

(10) Patent No.: US 6,532,150 B2
(45) Date of Patent: Mar. 11, 2003

(54) DISK DRIVE CARRIER APPARATUS AND ASSOCIATED METHOD

(75) Inventors: Clas Sivertsen, Lilburn, GA (US); James K. Hill, Jr., Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 96 days.

(21) Appl. No.: 09/871,066

(22) Filed: May 31, 2001

(65) Prior Publication Data

US 2002/0181196 A1 Dec. 5, 2002

(51) Int. Cl.$^7$ ................................................. G06F 1/16
(52) U.S. Cl. ........................ 361/685; 361/684; 361/727; 364/708.1; 312/310
(58) Field of Search .............................. 361/684, 685, 361/686, 724–727, 740, 747, 756, 759, 801; 312/310, 236, 332.1; 364/708.1; 395/828, 829, 834, 836; 439/152, 153, 157, 159, 160, 540, 928

(56) References Cited

U.S. PATENT DOCUMENTS

| | | | |
|---|---|---|---|
| 5,010,426 A | 4/1991 | Krenz | |
| 5,045,960 A | 9/1991 | Eding | |
| 5,077,722 A | 12/1991 | Geist et al. | |
| 5,195,022 A | 3/1993 | Hoppal et al. | |
| 5,463,527 A | 10/1995 | Hager et al. | |
| 5,481,431 A | * 1/1996 | Siahpolo et al. | ............ 361/685 |
| 5,517,373 A | 5/1996 | Hanson | |
| 5,579,204 A | 11/1996 | Nelson et al. | |
| 5,641,296 A | * 6/1997 | Larabell et al. | ............. 439/342 |
| 5,805,420 A | * 9/1998 | Burke | ........................ 361/727 |
| RE35,915 E | 10/1998 | Hastings et al. | |
| 6,049,451 A | 4/2000 | Schmitt et al. | |
| 6,097,567 A | 8/2000 | Hanson | |

* cited by examiner

*Primary Examiner*—Darren Schuberg
*Assistant Examiner*—Michael Datskovsky
(74) *Attorney, Agent, or Firm*—Alston & Bird LLP (57) ABSTRACT

An apparatus and method are provided to retain a disk drive on a carrier without connecting the disk drive to the carrier with a fastener. In addition to the carrier, the apparatus can include an alignment feature on the carrier for cooperating with a corresponding alignment feature of the disk drive to align the disk drive with the carrier. The apparatus also generally includes an actuation member for moving the carrier between a disengaged position and an operable position. The actuation member may include a linkage connected to the carrier, and a handle connected to the linkage. The handle is capable of being moved between first and second positions which correspondingly moves the carrier between disengaged and operable positions. The actuation member may also include a retention element connected to the handle for retaining the disk drive on the carrier while the handle is in the second position.

32 Claims, 7 Drawing Sheets

DISK DRIVE CARRIER APPARATUS AND ASSOCIATED METHOD

FIELD OF THE INVENTION

The present invention relates generally to a hard disk assembly including a disk drive supported by a carrier and, more particularly, to a disk carrier apparatus and an associated method in which the disk drive is retained on the carrier without connecting the disk drive to the carrier with a fastener, such as a screw.

BACKGROUND OF THE INVENTION

A disk storage system generally includes a number of hard disk assemblies, each of which includes a disk drive for storing data. Disk storage systems are utilized in a wide variety of computer systems that require substantial data storage capacity. For example, computer servers oftentimes include a disk storage system having a number of hard disk assemblies for storing relatively large quantities of data. Also, network attached storage is being developed to increase the storage capacity of computer systems.

Regardless of the computer system, it is generally desirable for the hard disk assemblies to be removable and replaceable. Preferably, it is desirable for the hard disk assemblies to be replaceable while the remainder of the computer system continues to operate. In other words, it is desirable for the hard disk assemblies to be hot-swappable. As such, a disk drive that fails can be replaced without interrupting the operation of the computer system.

Depending upon the configuration of the disk storage system, the hard disk assemblies can be removed and replaced in various manners. For example, a number of disk storage systems are configured such that each hard disk assembly is capable of being slid into a respective slot in order to establish electrical contract between the disk drive and a backplane, system bus or other electrical circuit that, in turn, electrically connects the hard disk with other components of the disk storage system and, more generally, the computer system. More particularly, each hard disk assembly generally includes a connector adapted to mate with a corresponding connector of the backplane, system bus or other electrical circuit in order to provide the appropriate electrical connection once the hard disk assembly has been fully inserted into the respective slot. In order to remove and replace the hard disk assembly, the hard disk assembly need merely be removed from the slot and another hard disk assembly inserted into the slot. To prevent tampering with the hard disk assemblies or otherwise inadvertent removal of the hard disk assemblies, the hard disk assemblies are typically mechanically fastened within a slot, and may be secured by means of a lock or the like.

In contrast to hard disk assemblies that are slidably inserted and removed, other disk storage systems do not provide for the direct access of each hard disk assembly. Instead, the hard disk assemblies may be disposed within a chassis that, in turn, is rack mounted. The entire chassis can then be accessed if any of the hard disk assemblies carried by the chassis are to be replaced.

Regardless of the configuration of the disk storage system, each disk drive is generally mounted upon a carrier. The carrier supports the disk drive and facilitates handling of the disk drive as well as the installation and removal of the disk drive. While a variety of different carriers have been developed, a common carrier includes a housing defining an internal cavity in which the disk drive is mounted. In this regard, the housing typically includes upper and lower panels and a pair of side walls connecting the upper and lower panels and defining the internal cavity therewithin. The disk drive is disposed within the internal cavity and is connected to the housing by means of a number of screws or other threaded fasteners. In this regard, most disk drives define a number of threaded holes for receiving corresponding screws or other threaded fasteners that extend through the housing and engage the disk drive. As such, the disk drive is mechanically connected to the housing. In this regard, the disk drive industry has developed standards that govern the location and size of the threaded holes defined by disk drives to provide for uniformity throughout the industry.

While the housing does serve to protect the disk drive, the attachment of the disk drive to the housing by means of a number of screws complicates the assembly of the disk drive and the carrier, and the removal of the disk drive from the carrier, such as during replacement of the disk drive. In this regard, the assembly of the disk drive and the carrier typically requires that the disk drive be positioned within the internal cavity defined by the housing and that a number of screws be inserted through the walls of the housing so as to threadably engage the disk drive. Conversely, in order to remove the disk drive from the housing, each of the screws must first be removed. As will be apparent, the insertion and removal of the screws increases the time required to assemble and disassemble a hard disk assembly. This increase in the time required for assembly and disassembly of a disk drive assembly is particularly evident for information services personnel that only occasionally have to assemble or disassemble a hard disk assembly and are therefore less familiar with the process than the manufacturer. It would therefore be advantageous to design a disk drive assembly that is capable of being assembled and disassembled in a more efficient and timely manner.

In operation, the disk drives generate heat. In order to prevent excessive heating of the disk drive which may impair the operation of the disk drive, the heat generated by the disk drive is preferably removed. However, the housings of conventional hard disk assemblies are oftentimes formed of plastic. As such, the plastic housings will not serve to draw heat from the disk drives. Instead, a substantial airflow must be directed over the disk drives to cool the disk drives and prevent overheating. Thus, disk storage systems generally include means, such as fans, for generating the airflow and for directing the airflow over the disk drives. Since the generation and direction of the airflow can complicate the design of a disk storage system, it would also be advantageous to design a disk drive assembly that does not require as much airflow to remove heat generated by the disk drive, thereby simplifying the design of the disk storage system.

SUMMARY OF THE INVENTION

An improved apparatus for supporting a disk drive and an associated method for connecting the disk drive with an electrical circuit, such as a backplane, a system bus, or other electrical circuit are provided. The apparatus and method of the present invention permit the disk drive to be retained on a carrier without having to connect the disk drive to the carrier with a fastener, such as one or more screws. As such, the disk drive and the carrier can be assembled and disassembled in a much more efficient and timely manner than conventional hard disk assemblies.

According to one embodiment of the present invention, an apparatus for supporting a disk drive is provided that includes a carrier for receiving and supporting the disk drive and an alignment feature on the carrier for cooperating with a corresponding alignment feature of the disk drive to align the disk drive with the carrier. In one embodiment, the alignment feature includes at least one alignment pin for engaging at least one respective hole defined by the disk drive. In this regard, the holes defined by the disk drive can be the threaded holes that are otherwise engaged by screws or other threaded fasteners in conventional hard disk assemblies. The apparatus of this embodiment also includes an actuation member for moving the carrier between a disengaged position and an operable position. In the disengaged position, the disk drive is capable of being loaded onto and unloaded from the carrier. Conversely, in the operable position, the disk drive is connected with an electrical circuit, such as a backplane, a system bus or the like. The disk drive is therefore retained on the carrier once the actuation member has moved the carrier to the operable position without otherwise connecting the disk drive to the carrier with a fastener. Thus, the assembly of the disk drive and the carrier and the disassembly of the disk drive from the carrier are more efficient since the disk drive need not be connected to the carrier by means of a number of screws.

According to another aspect of the present invention, an apparatus for supporting the disk drive includes the carrier for receiving and supporting the disk drive, a linkage operably connected to the carrier, and a handle operably connected to the linkage such that the linkage operably connects the handle and the carrier. The handle is capable of being moved between first and second positions which correspondingly moves the carrier between the disengaged position and the operable position. Thus, the actuation member of the foregoing embodiment may include the linkage and the handle. According to this aspect of the present invention, the apparatus also includes a retention element operably connected to the handle for retaining the disk drive on the carrier while the handle is in the second position and for releasing the disk drive while the handle is in the first position. Thus, the actuation member of the foregoing embodiment may also include the retention element. The retention element is typically carried by the handle and is capable of operably contacting the side of the disk drive opposite the carrier while the handle is in the second position. Thus, the disk drive is snugly retained between the retention element and the carrier. The retention element can also include an angled lip that is capable of being grasped to move the handle from the second position to the first position.

In one embodiment, the apparatus further includes a base. In this embodiment, the handle is moveably connected to the base and the carrier is mounted upon and slidably disposed relative to the base. For example, the handle may be rotatably mounted to the base so as to be capable of being rotated between the first and second positions such that the carrier correspondingly slides between the disengaged and operable positions. The base and the carrier of this embodiment can also cooperate to define a stop to limit travel of the carrier relative to the base. Preferably, the base and the carrier are formed of a thermally conductive material such that heat generated by the disk drive during operation is conducted to the base for disposal.

The apparatus of this embodiment can also include a cover and a contact member mounted upon the surface of the cover facing the disk drive. The contact member is typically a resilient pad and is adapted to operably contact the handle and/or the retention element to maintain the handle in the second position and the carrier in the corresponding operable position. Thus, once the carrier is in the operable position, the carrier cannot be inadvertently moved to the disengaged position unless the cover has first been removed.

In operation, the disk drive is therefore placed upon the carrier while the carrier is in the disengaged position. In order to align the disk drive with the carrier, corresponding alignment features of the disk drive and the carrier can be mated while placing the disk drive upon the carrier. For example, at least one alignment pin carried by the carrier can be mated with at least one respective hole defined by the disk drive in order to appropriately align the disk drive and the carrier.

Once the disk drive has been placed upon the carrier, the carrier can be moved from the disengaged position to an operable position in which the disk drive is connected with the electrical circuit. For example, the carrier can be slidably moved relative to a base. More preferably, the handle that is operably connected to the carrier can be moved from a first position to a second position in order to correspondingly move the carrier from the disengaged position to the operable position. In order to prevent over-insertion of the disk drive, travel of the carrier may be limited, such as by a stop.

Once the carrier has been moved to the operable position, the disk drive is advantageously retained on the carrier without connecting the disk drive to the carrier with a fastener. In this regard, the surface of the disk drive opposite the carrier may be operably contacted by a retention element carried by the handle. As such, the disk drive will be snugly retained between the retention element and the carrier. In order to maintain the handle in the second position and the carrier in the corresponding operable position, the cover can be placed over the disk drive and the carrier such that a contact member, such as a resilient pad, carried by the cover operably contacts the handle and/or the retention element.

The apparatus and associated method of the present invention therefore retain the disk drive on the carrier once the disk drive has been connected to an electrical circuit without requiring the disk drive to be connected to the carrier with one or more fasteners, such as one or more screws. Thus, the disk drive can be quickly assembled and easily disassembled since the technician need not install or remove a number of screws. However, the apparatus of the present invention does securely retain the disk drive on the carrier and prevent inadvertent removal or disconnection of the disk drive from the electrical circuit.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
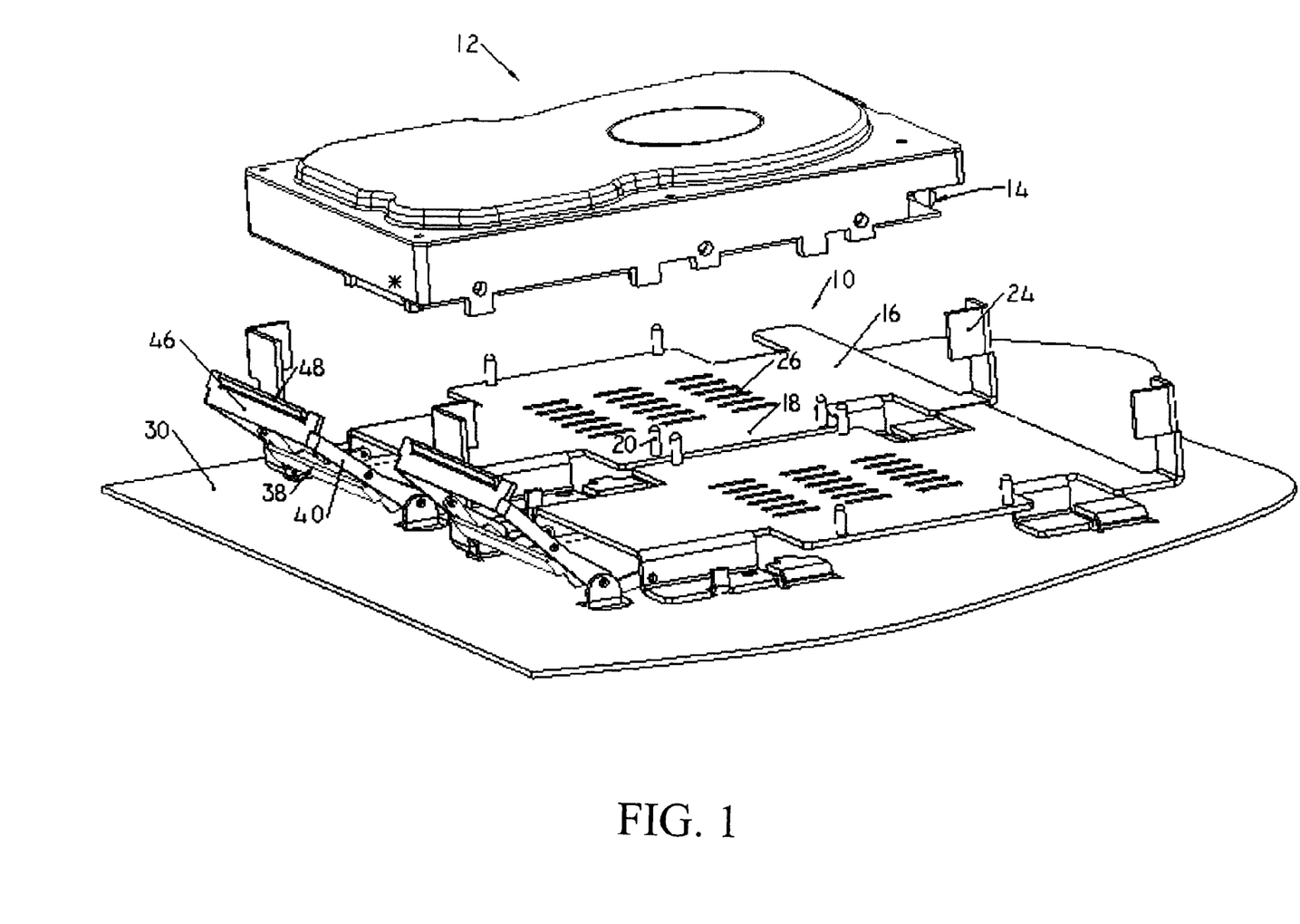
FIG. 1 is a perspective view depicting a disk drive positioned above a disk drive carrier apparatus according to one advantageous embodiment of the present invention.
Figure 4A:
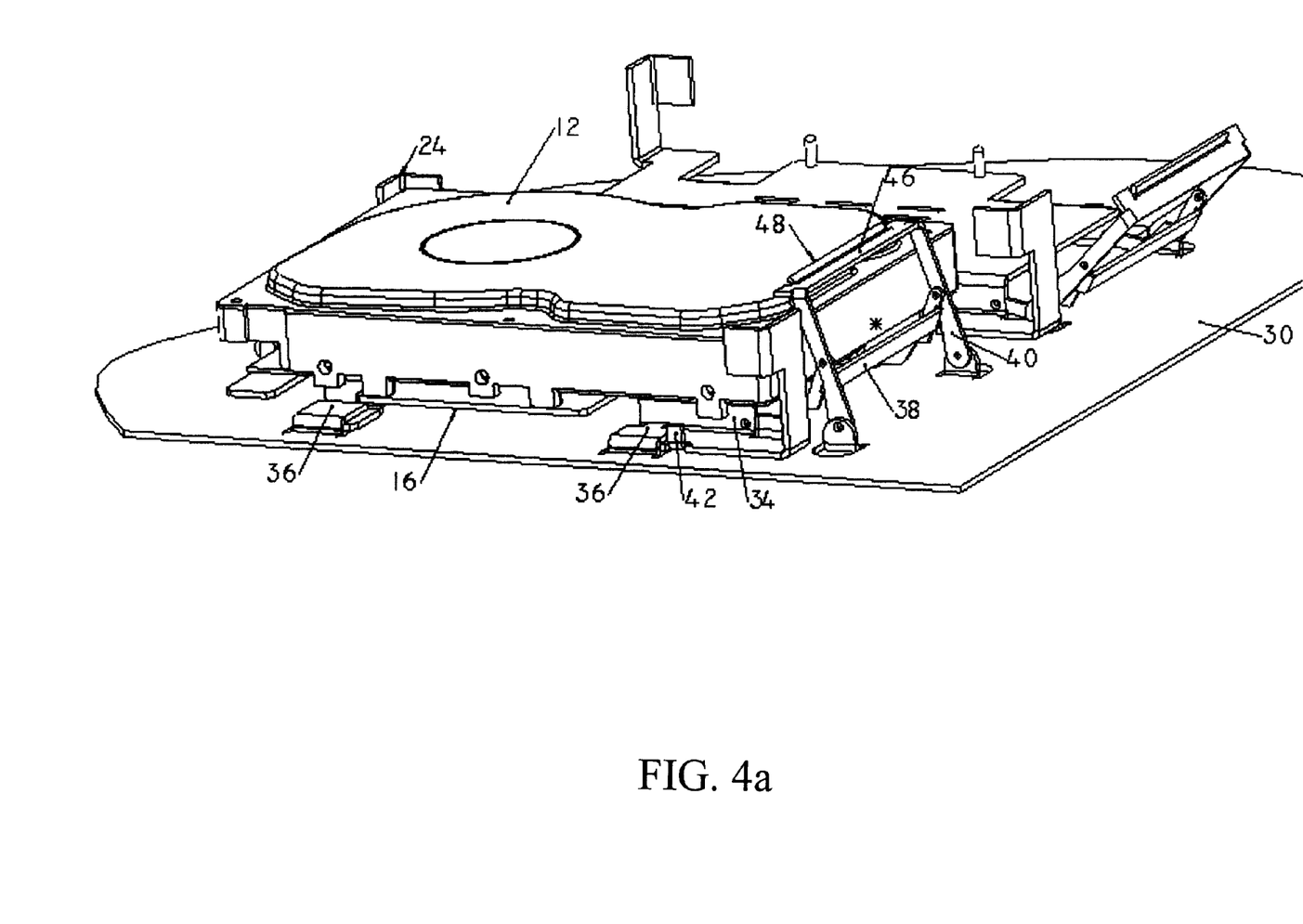
FIGS. 4a and 4b are perspective views from opposite sides of the disk drive and the disk drive carrier apparatus of FIGS. 1–3 after the disk drive has been seated upon the carrier and the handle has been moved to the second position which correspondingly moves the carrier to the operable position.
Figure 4B:
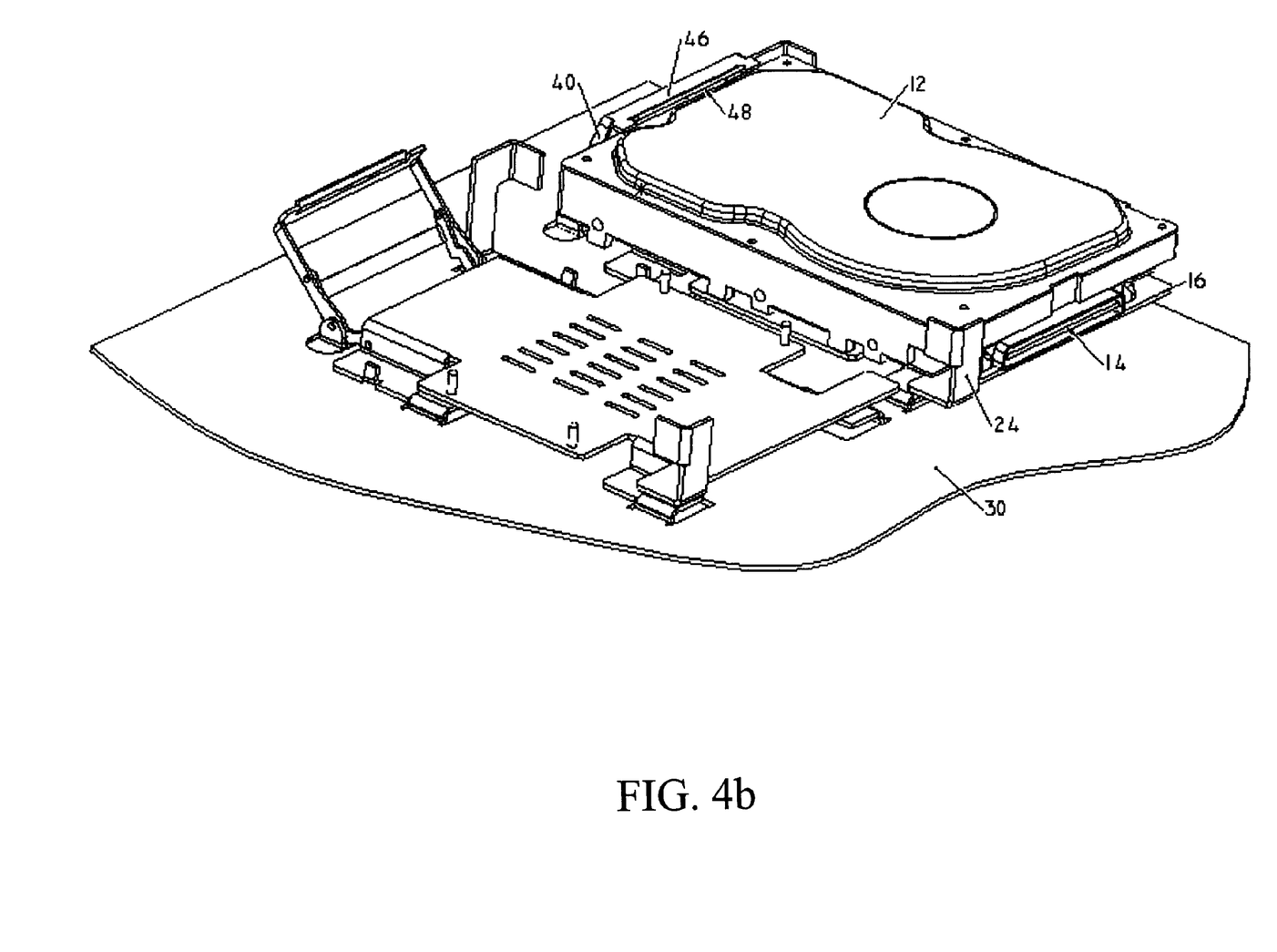

Referring now to FIG. 1, an apparatus 10 for supporting a disk drive 12 according to one advantageous embodiment of the present invention is depicted. The disk drive can be any of a number of conventional disk drives, such as the disk drives that are commercially available from disk drive manufactures, such as Seagate Technology LLC. As explained below, the disk drive includes a connector 14 proximate one end for establishing electrical connection with an electrical circuit. Although a single disk drive carrier apparatus will be primarily described hereinafter for purposes of explanation, the disk drive supported by the disk drive carrier apparatus of the present invention is typically one portion of a disk storage system that includes a number of disk drives, each preferably supported by a respective disk drive carrier apparatus. For example, although a single disk drive is shown in FIGS. 1, 4a and 4b to be mounted upon a respective disk drive carrier apparatus, an adjacent disk drive carrier apparatus is also depicted for purposes of illustration. As will be apparent, another disk drive may be mounted upon the adjacent disk drive carrier apparatus in the same manner described hereinbelow. The disk storage system is, in turn, typically in communication with or forms a portion of a server, network attached storage or other computer system for storing data therefore. As such, the electrical circuit with which the disk drive is connected is typically a backplane, a system bus or the like for connecting the disk drive to other portions of the disk storage system and, in turn, the server, network attached storage or other computer system.

The disk drive carrier apparatus 10 of the present invention includes a carrier 16 for receiving and supporting the disk drive 12. Typically, the carrier has a support surface 18 that is sized to approximate the size of one of the major surfaces of the disk drive. However, it should be understood that the support surface of a carrier may be larger or smaller than the disk drive. Regardless of the size, the carrier preferably supports the disk drive such that the disk drive is maintained in a desired orientation and position within the disk storage system. The carrier can be fabricated of any of a variety of materials, but is formed of sheet metal in one embodiment.

The disk drive carrier apparatus 10 preferably includes alignment features associated with the carrier 16 and the disk drive 12 such that the disk drive is positioned in an aligned relationship with respect to the carrier. In the illustrated embodiment, for example, the disk drive carrier apparatus includes a plurality of alignment pins 20 that are carried by and extend upwardly from the support surface 18 of the carrier. Correspondingly, the disk drive defines a number of holes 22 that are sized and shaped to receive respective alignment pins. By seating the disk drive upon the carrier in such a way that the alignment pins extend into respective holes defined by the disk drive, the disk drive may be aligned relative to the carrier. Since the carrier is, in turn, disposed in an aligned position relative to a connector on the backplane, the system bus or other electrical circuit, the alignment of the disk drive to the carrier ensures that the connector 14 of the disk drive will subsequently be appropriately aligned with the connector of the backplane, the system bus or other electrical circuit.

As described above, disk drives 12 conventionally define a number of threaded holes 22 in standardized locations for receiving screws that are utilized to mount the disk drive within a housing of a conventional disk drive assembly. As such, the alignment pins 20 are preferably positioned and sized to be received within respective threaded holes defined by conventional disk drives. Thus, the disk drive carrier apparatus 10 of the present invention is capable of receiving and supporting many different conventional disk drives having threaded holes in the standardized locations.

The carrier 16 can also include at least one seating guide 24. In the embodiment depicted in FIG. 1, for example, the carrier includes a pair of seating guides disposed at opposite corners of the carrier for engaging respective corners of the disk drive 12 as the disk drive is mounted upon the carrier and for guiding the disk drive in such a manner that the alignment pins 20 carried by the carrier engage respective holes 22 defined by the disk drive. The seating guides of the illustrated embodiment are L-shaped members that extend upwardly beyond the support surface 18 for engaging respective corners of the disk drive. It should be understood, however, that the carrier need not include seating guides or may include different numbers of seating guides or seating guides having other configurations, if so desired.

The carrier 16 of the illustrated embodiment also includes a number of openings 26 defined by the support surface 18 and, more particularly, by a medial portion of the support surface. By defining openings, air is permitted to circulate through the carrier and into contact with the disk drive 12 in order to cool the disk drive. In order to facilitate air circulation in this embodiment, the support surface can also be spaced from any underlying surface, as will be described hereinbelow. It should be understood, however, that the carrier need not include openings and the disk drives can be cooled in other manners, such as by fans, if necessary.

Figure 6:
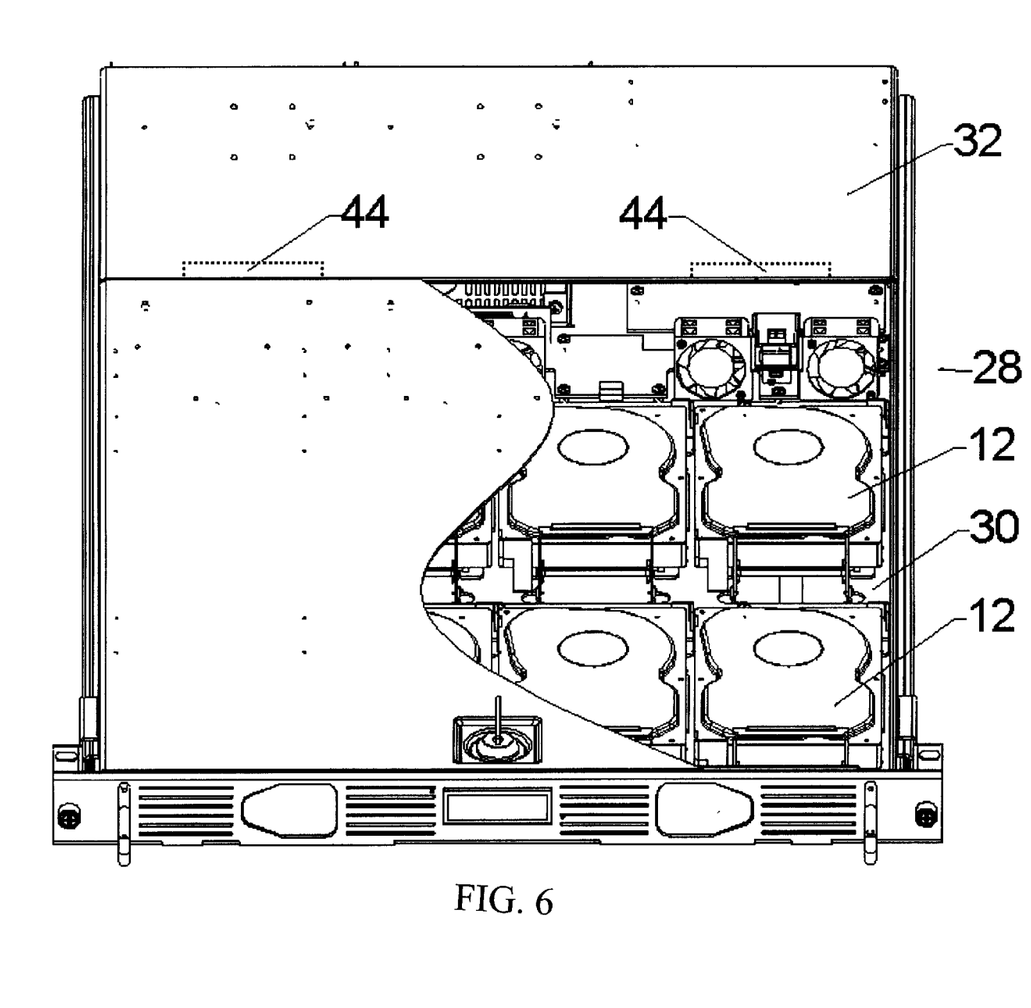
FIG. 6 is a perspective view of a disk drive carrier apparatus according to one embodiment of the present invention that includes a cover carrying a contact member that overlies a carrier that is supporting a disk drive in the operable position.

In one advantageous embodiment depicted in FIG. 6, the carrier 16 and, in turn, the disk drive 12 supported by the carrier are mounted within an internal cavity defined by a chassis 28 having a base 30 and an overlying cover 32. While the cover depicted in FIG. 6 includes two parts that cooperate to completely cover the base, the cover can be a single piece if desired. The carrier depicted in FIG. 1 is mounted upon a base and is adapted for movement, i.e., slidable movement, relative to the base. In the illustrated embodiment in which the support surface 18 is spaced from the base, the carrier includes a plurality of feet 34. For example, the carrier can include a foot proximate each corner of the support surface. Each foot includes a downturned portion for spacing the support surface of the carrier from the base and a contact portion extending outwardly from a distal end of the downturned portion. Additionally, the base of the illustrated embodiment includes a plurality of corresponding engagement members 36. In particular, the base preferably includes the same number of engagement members as the number of feet of the carrier. The engagement members are positioned to engage respective feet of the carrier. In the illustrated embodiment, for example, the engagement members may be positioned proximate respective corners of the support surface such that each engagement member engages a respective foot of the carrier. While the engagement members can be configured differently so long as the engagement members engage the feet, each engagement member of the illustrated embodiment is an L-shaped member that defines a space between the engagement member and the remainder of the base in which the contact portion of the respective foot is received. By engaging each foot with a corresponding engagement member, the carrier cannot be lifted upwardly from the base. However, since the feet and the corresponding engagement members are only located along a pair of opposed sides of the carrier, the carrier can slide in a direction indicated by reference numeral 37 in FIG. 3 relative to the base.

Preferably, both the carrier 16 and the base 30 are formed of thermally conductive materials, such as sheet metal. Thus, heat generated by the disk drive 12 during operation is conducted via the carrier and through the feet 34 of the carrier to the base for disposal. Thus, the airflow requirements of the disk storage system may be substantially reduced since the disk storage system need no longer rely upon relatively inefficient thermal convection processes to cool the disk drives, but, instead, utilizes thermal convection via the carrier and the base to dispose of at least a substantial portion of the heat generated by the disk drive.

Figure 2:
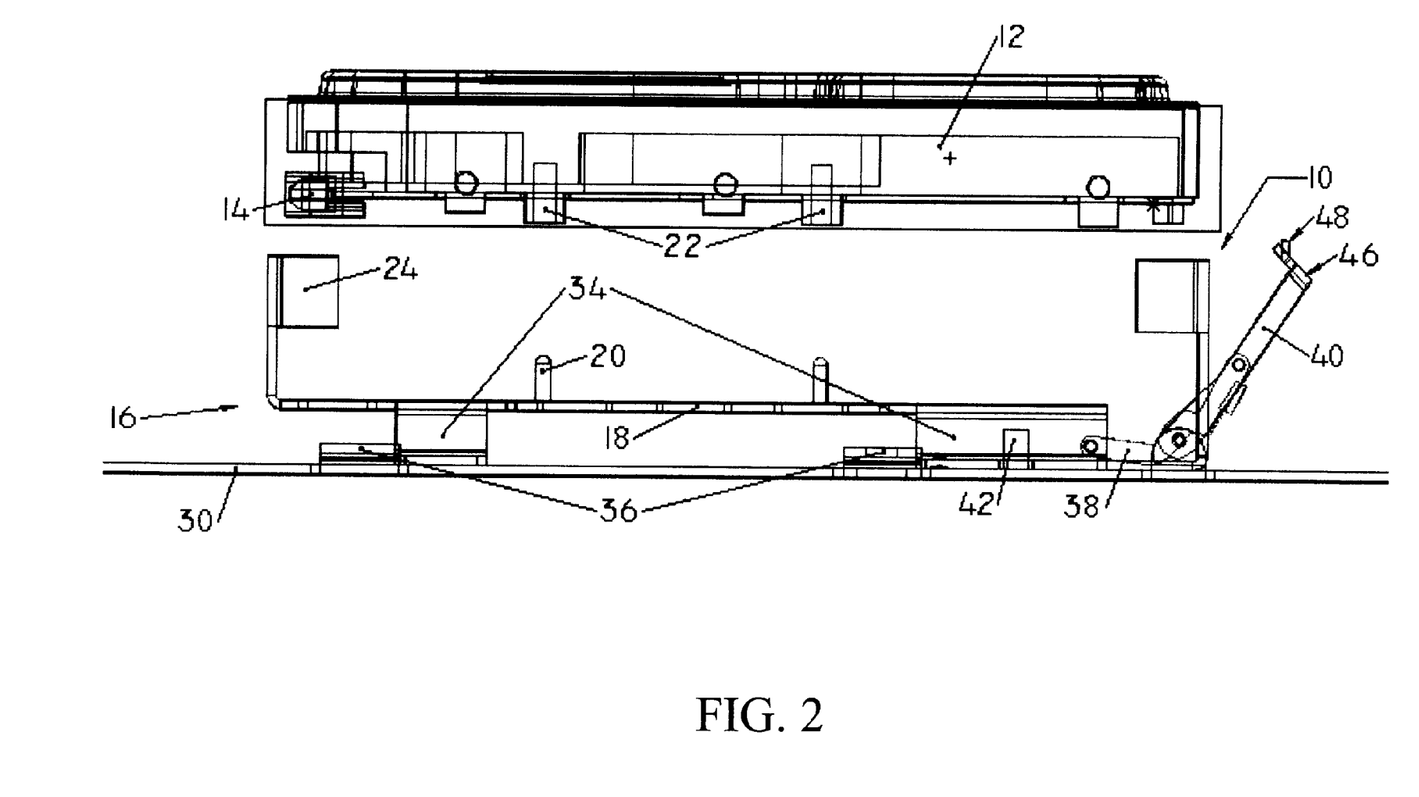
FIG. 2 is a side view of the disk drive and the disk drive carrier apparatus of FIG. 1.
Figure 3:
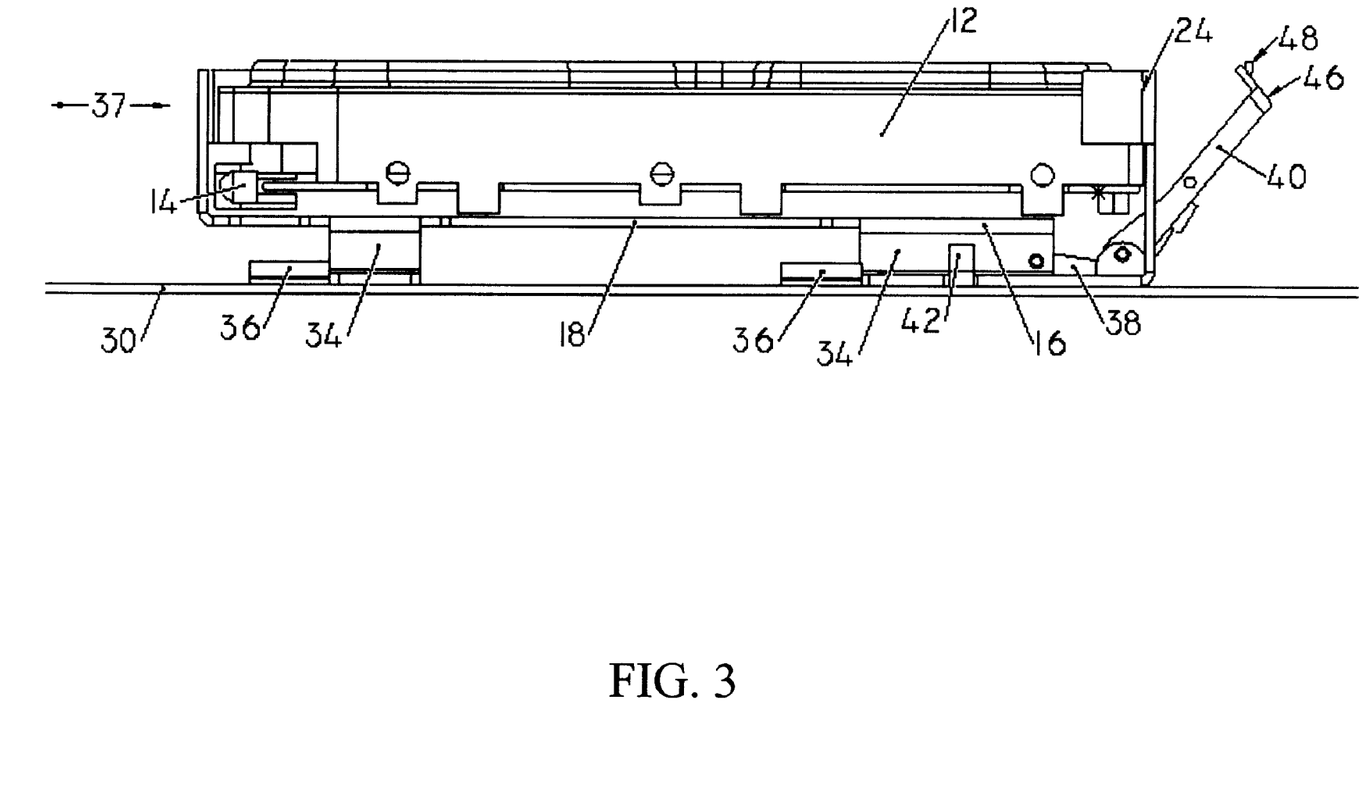
FIG. 3 is a side view of the disk drive and the disk drive carrier apparatus of FIGS. 1 and 2 following seating of the disk drive upon the carrier while the handle is in the first position and the carrier is in the corresponding disengaged position.

The disk drive carrier apparatus 10 of the present invention also includes an actuation member for moving the carrier 16 between a disengaged position and an operable position. In this regard, the disengaged position is illustrated in FIGS. 1–3 in which the disk drive 12 is capable of being loaded onto and unloaded from the carrier. In contrast, in the operable position depicted in FIGS. 4a, 4b and 5, the disk drive is no longer free to be loaded onto and unloaded from the carrier and is, instead, connected to the electrical circuit. In this regard, the connector 14 of the disk drive is typically mated with a corresponding connector of the backplane, the system bus or other electrical circuit once the carrier is in the operable position. As explained in more detail below, the disk drive carrier apparatus of the present invention advantageously retains the disk drive on the carrier once the actuation member has moved the carrier to the operable position without otherwise connecting the disk drive to the carrier with a fastener, such as one or more screws or other threaded fasteners, as required by many conventional hard disk assemblies. Thus, the disk drive carrier apparatus of the present invention facilitates loading and unloading of the disk drive without requiring a technician to either insert a number of screws to connect the carrier and the disk drive or to remove a number of screws in order to release the disk drive from the carrier. However, the disk drive carrier apparatus of the present invention securely retains the disk drive in an aligned position relative to the carrier such that an electrical connection can be established and maintained.

In one advantageous embodiment, the actuation member includes a linkage 38 operably connected to the carrier 16, and a handle 40 operably connected to the linkage such that the linkage operably connects the handle to the carrier. In this regard, the handle of the illustrated embodiment includes a pair of handle members, each of which is connected to the linkage and to each other so as to move in unison. The handle is capable of being moved between first and second positions which correspondingly moves the carrier between the disengaged and operable positions. While the handle and linkage can be differently configured in order to establish other first and second positions, the handle of the illustrated embodiment generally extends outwardly from the carrier in the first position in which the carrier is in the disengaged position. By rotating the handle of the illustrated embodiment upwardly and toward the carrier, however, the linkage causes the carrier to slide relative to the base 30 in order to bring the connector 14 of the disk drive 12 into alignment and in mating relationship with a connector of the backplane, system bus or other electrical circuit. In order to subsequently disconnect the disk drive from the backplane, system bus or other electrical circuit, the handle need merely be returned from the second position to the first position in order to cause the carrier to slide in the opposite direction relative to the base and into the disengaged position in which the disk drive is released and may be readily unloaded and loaded. While the actuation member can include a wide variety of handles and linkages, the linkage of the illustrated embodiment advantageously converts the rotational movement of the handle into translational, sliding movement of the carrier relative to the base in order to slidably move the carrier between the disengaged and operable positions.

Figure 5:
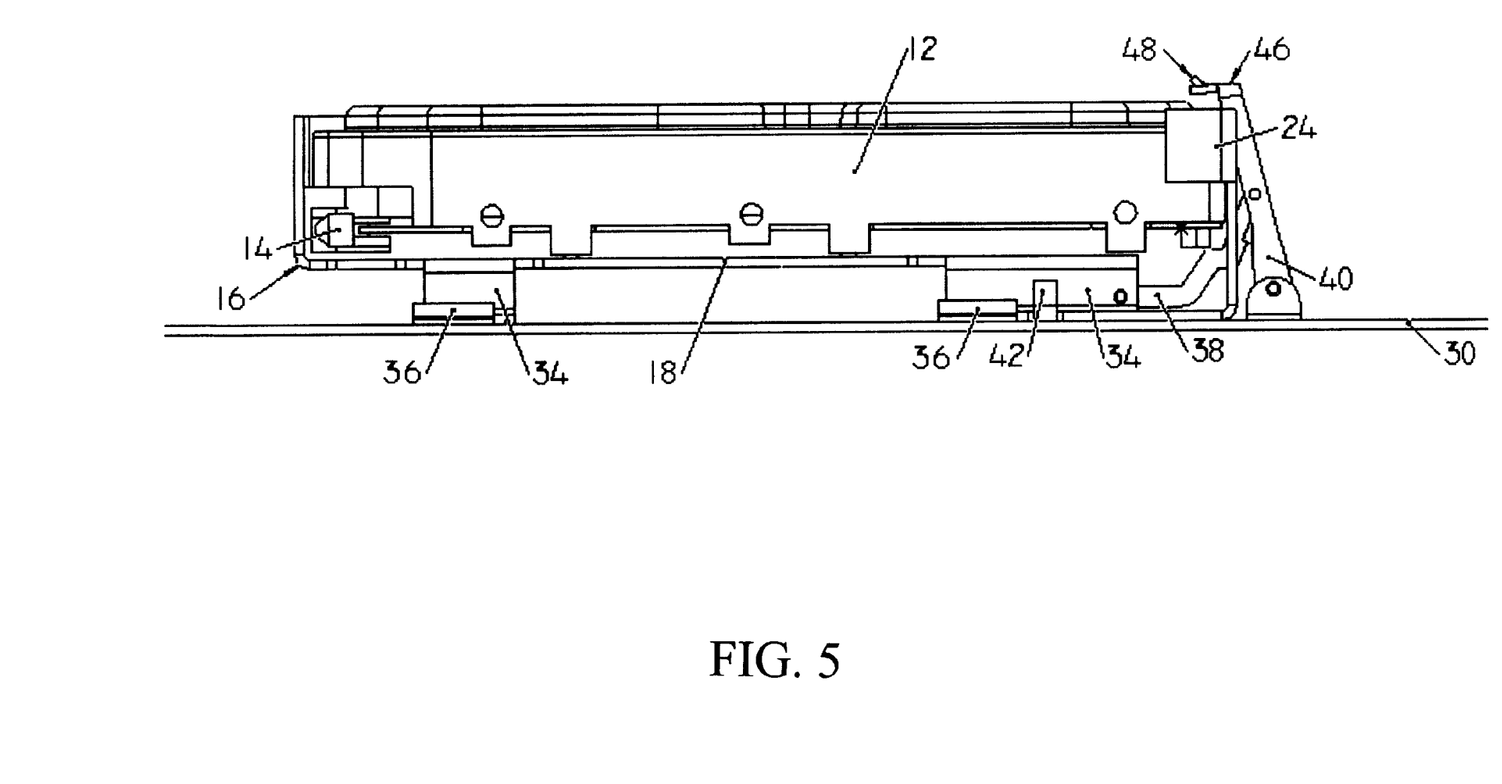
FIG. 5 is a side view of the disk drive and the disk drive carrier apparatus of FIGS. 4a and 4b.

The actuation member also preferably includes a retention element 46 for retaining the disk drive 12 on the carrier 16 while the carrier is in the operable position and for releasing the disk drive from the carrier while the carrier is in the disengaged position. In the illustrated embodiment in which the handle 40 comprises a pair of handle members, the retention element can include a cross member extending between and interconnecting the handle members. The cross member is positioned relative to the carrier and the disk drive such that the retention element operably contacts the surface of the disk drive that is opposite the carrier while the handle is in the second position as shown in FIGS. 4a, 4b and 5. Thus, the disk drive is snugly retained between the retention element and the carrier while the handle is in the second position and the carrier is in the corresponding operable position. Upon moving the handle to the first position and the carrier to the corresponding disengaged position, however, the retention element is spaced apart from the disk drive and no longer retains the disk drive upon the carrier, thereby permitting the disk drive to be readily removed. However, while the handle is in the second position, the retention element securely retains the disk drive upon the carrier.

While the actuation member including the handle 40 and the retention member 46 can be disposed at any of a variety of positions relative to the carrier 16, the actuation member is preferably disposed proximate the end of the carrier that is opposite the end of the disk drive 12 that includes the connector 14. Thus, once the handle is moved to the second position and the carrier is moved to the corresponding operable position, the disk drive is engaged at one end by the mating of the connector of the disk drive with the connector of the backplane, system bus or other electrical circuit and at the other end by the retention element. Thus, the disk drive is securely retained upon the carrier without having to connect the disk drive to the carrier with fasteners, such as screws or the like, as in conventional hard disk assemblies.

In order to assist in the movement of the handle 40 from the second position to the first position, the retention element 46 can include an angled lip 48 that a technician can readily grasp. In this regard, the angled lip of the retention element is typically angled upwardly away from the disk drive 12 to provide a feature that can be grasped by a technician since the remainder of the retention element is generally flush with the surface of the disk drive.

While the disk drive carrier apparatus 10 is preferably designed to move the carrier 16 into an operative position in which the connector 14 of the disk drive 12 snugly and securely engages the connector of the backplane, system bus or other electrical circuit, the apparatus of the present invention preferably prevents over insertion of the connector of the disk drive into the connector of the backplane, system bus or other electrical circuit. Thus, the base 30 and the carrier of one advantageous embodiment cooperate to define a stop to limit the travel of the carrier relative to the base. In the illustrated embodiment, for example, one or more feet 34 of the carrier include an upstanding member 42 on the contact portion. Thus, abutment of the upstanding member with the respective engagement member 36 of the base prevents further travel of the carrier relative to the base. By appropriately positioning the upstanding member relative to the carrier and, in turn, the disk drive supported by the carrier and the connector of the backplane, system bus or other electrical circuit, the actuation member can move the carrier from the disengaged position into the operable position in which the connector of the disk drive is securely received and mated with the connector of the backplane, system bus or other electrical circuit prior to contact of the upstanding member with the respective engagement member of the base. However, attempts to further advance the carrier relative to the base will be prevented by contact of the upstanding member with the respective engagement member. While the configuration of the stop described above is advantageous, it should be understood that the base and the carrier can cooperate to define other types of stops for preventing over insertion of the connector of the disk drive.

The disk drive carrier apparatus 10 preferably includes means for maintaining the handle 40 in the second position and the carrier 16 in a corresponding operable position. In other words, the disk drive carrier apparatus preferably includes means for preventing the carrier from being inadvertently moved to the disengaged position which, in turn, would disconnect the disk drive 12 from the backplane, system bus or other electrical circuit. In one embodiment, the disk drive carrier apparatus includes a contact member 44, such as a resilient pad, mounted to the inner surface of the cover 32 that faces the disk drive as shown in FIG. 6. The contact member is adapted to operably contact the actuation member, thereby maintaining the handle in the second position and the carrier in the corresponding operable position. Thus, the carrier will not be inadvertently moved to the disengaged position which, in turn, would disconnect the hard drive from the backplane, system bus or other electrical circuit. Instead, in order to disconnect the disk drive from the backplane, system bus or other electrical circuit, the cover would have to be removed and the handle then moved from the second position to the first position such that the carrier would also be moved to the corresponding disengaged position. While the illustrated embodiment is advantageous, it should be understood that the means for maintaining the handle in the second position and the carrier in the corresponding operable position can be embodied in other manners. For example, one or more of the feet 34 of the carrier or the engagement members 36 of the base 30 can include a dimple that increases the frictional forces between the feet of the carrier and the engagement members of the base. As such, the handle would be maintained in the second position and the carrier in the corresponding operable position until a technician applied sufficient force to the handle to overcome the frictional forces to move the handle from the second position to the first position.

In operation, a disk drive 12 is therefore placed upon the support surface 18 of a carrier 16 while the carrier is in the disengaged position. In order to ensure that the connector 14 of the disk drive will be appropriately aligned with the connector of the backplane, system bus or other electrical circuit with which the disk drive is to be connected, corresponding alignment features of the disk drive and the carrier may be aligned while the disk drive is placed upon the carrier in order to appropriately align the disk drive with the carrier. In this regard, alignment pins 20 carried by the carrier may be inserted into corresponding holes 22 defined by the disk drive. By sizing and positioning the alignment pins appropriately, the alignment pins can be inserted into the threaded holes defined by conventional disk drives and otherwise adapted to receive the threaded fasteners utilized by conventional disk drive assemblies to mount the disk drives within respective housings.

Thereafter, the carrier 16 is moved from the disengaged position to the operable position in which the disk drive 12 is connected with the electrical circuit. In this regard, the connector 14 of the disk drive 12 is mated with a corresponding connector of the backplane, system bus or other electrical circuit. Due to the alignment of the disk drive relative to the carrier and the alignment of the carrier relative to the connector of the backplane, system bus or other electrical circuit, the connection of the disk drive to the electrical circuit can be reliably established. Typically, the carrier is slidably moved relative to the base 30 by moving the handle 40 that is operably connected to the carrier from a first position to a second position which correspondingly moves the carrier from the disengaged position to the operable position. As described above, the travel of the carrier can be limited, such as by a stop, to prevent over insertion of the disk drive.

According to the present invention, the disk drive 12 is retained on the carrier 16 once the carrier is moved to the operable position without having to connect the disk drive to the carrier with a fastener, such as the plurality of screws or other threaded fasteners utilized by conventional hard disk assemblies. In this regard, the disk drive is retained on the carrier by operably contacting the surface of the disk drive that is opposite the carrier with a retention element 46 carried by the handle 40 such that the disk drive is snugly retained between the retention element and the carrier. A cover 32 can then be placed over the disk drive and the carrier such that a contact member 44 carried by the cover operably contacts the handle and/or the retention element so as to maintain the handle in the second position and the carrier in the corresponding operable position. For example, each contact member of the embodiment depicted in FIG. 6 is a pad or tab disposed on the inner surface of the cover. It should be understood, however, that the contact member can be formed in other manners.

In order to remove the disk drive 12 such as for replacement purposes, the foregoing assembly steps are essentially reversed. In this regard, the cover 32 is initially remained in order to expose the disk drive mounted upon the carrier 16. The handle 40 is then moved to the first position such that the carrier correspondingly moves to the disengaged position. In order to move the handle to the first position, the angled lip 48 of the retention element 46 is generally grasped by a technician and force is applied to rotate the handle to the first position. As such, the retention element 46 releases the disk drive and the disk drive is capable of being lifted from the carrier once the carrier is in the disengaged position. Thus, the disk drive can be removed and replaced without having to remove any fasteners, such as the screws required by conventional hard disk assemblies.

While the disk drive carrier apparatus 10 and associated method have been described in conjunction with a single disk drive 12 and associated carrier 16, a disk storage system typically includes a number of disk drives as shown in FIG. 6. Moreover, the chassis 28 described above is typically designed to hold a number of disk drives, such as eight, twelve or more disk drives. As will be apparent to those skilled in the art, each disk drive of a disk storage system, such as each disk drive disposed within a chassis can be mounted upon a respective carrier such that each disk drive can be readily moved between disengaged and operable positions as described in detail above. By way of example, network attached storage may include a chassis that houses eight or twelve disk drives, each of which are mounted upon a respective carrier and are therefore capable of being moved between disengaged and operative positions as described above. As shown in FIG. 6, the network attached storage also generally includes other components, such as one or more power supplies and a controller or motherboard for facilitating the connection of the network attached storage to the remainder of a computer system.

Regardless of the application, the disk drive carrier apparatus 10 and associated method of the present invention retain the disk drive 12 on the carrier 16 once the disk drive has been connected to an electrical circuit without requiring the disk drive to be connected to the carrier with one or more fasteners, such as one or more screws. Thus, the disk drive can be quickly assembled and easily disassembled since the technician need not install or remove a number of screws. However, the apparatus and method of the present invention securely retain the disk drive on the carrier and prevent inadvertent removal of a disk drive or disconnection of the disk drive from the electrical circuit.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for supporting a disk drive comprising:
   a carrier for receiving and supporting the disk drive;
   an alignment feature on said carrier for cooperating with a corresponding alignment feature of the disk drive to align the disk drive with said carrier; and
   an actuation member for moving said carrier between a disengaged position in which the disk drive is capable of being loaded onto and unloaded from said carrier and an operable position in which the disk drive is connected with an electrical circuit,
   and a retention member by which the disk drive is retained on said carrier once said actuation member has moved said carrier to the operable position.

2. An apparatus according to claim 1 wherein said actuation member comprises:
   a linkage operably connected to said carrier; and
   a handle operably connected to said linkage such that said linkage operably connects said handle and said carrier, said handle being capable of being moved between first and second positions which correspondingly moves said carrier between the disengaged and operable positions.

3. An apparatus according to claim 2 further comprising a base, wherein said handle is movably connected to said base, and wherein said carrier is mounted upon and slidably disposed relative to said base.

4. An apparatus according to claim 3 wherein said handle is rotatably connected to said base and is capable of being rotated between the first and second positions such that said carrier correspondingly slides between the disengaged and operable positions, respectively.

5. An apparatus according to claim 3 wherein said base and said carrier cooperate to define a stop to limit travel of said carrier relative to said base.

6. An apparatus according to claim 3 further comprising:
   a cover; and
   a contact member mounted upon a surface of said cover facing the disk drive, said contact member adapted to operably contact said actuation member to maintain the handle in the second position and the carrier in the corresponding operable position.

7. An apparatus according to claim 6 wherein said contact member comprises a resilient pad.

8. An apparatus according to claim 3 wherein said carrier and said base are formed of a thermally conductive material in order to conduct heat generated by the disk drive to said base.

9. An apparatus according to claim 1 wherein said actuation member comprises a retention element for retaining the disk drive on said carrier while said carrier is in the operable position and for releasing the disk drive while said carrier is in the disengaged position.

10. An apparatus according to claim 9 wherein said retention element comprises an angled lip capable of being grasped to move said actuation member.

11. An apparatus according to claim 1 wherein said alignment feature comprises at least one alignment pin for engaging at least one respective hole defined by the disk drive.

12. An apparatus according to claim 1 further comprising at least one seating guide carried by said carrier for aligning the disk drive with said carrier.

13. An apparatus for supporting a disk drive comprising:
   a carrier for receiving and supporting the disk drive;
   a linkage operably connected to said carrier;
   a handle operably connected to said linkage such that said linkage operably connects said handle and said carrier, said handle being capable of being moved between first and second positions which correspondingly moves said carrier between a disengaged position in which the disk drive is capable of being loaded onto and unloaded from said carrier and an operable position in which the disk drive is connected with an electrical circuit; and
   a retention element operably connected to said handle for retaining the disk drive on said carrier while said handle is in the second position and for releasing the disk drive while said handle is in the first position.

14. An apparatus according to claim 13 further comprising a base, wherein said handle is movably connected to said base, and wherein said carrier is mounted upon and slidably disposed relative to said base.

15. An apparatus according to claim 14 wherein said handle is rotatably connected to said base and is capable of being rotated between the first and second positions such that said carrier correspondingly slides between the disengaged and operable positions, respectively.

16. An apparatus according to claim 14 wherein said base and said carrier cooperate to define a stop to limit travel of said carrier relative to said base.

17. An apparatus according to claim 14 further comprising:
  a cover; and
  a contact member mounted upon a surface of said cover facing the disk drive, said contact member adapted to operably contact at least one of said handle and said retention element to maintain the handle in the second position and the carrier in the corresponding operable position.

18. An apparatus according to claim 17 wherein said contact member comprises a resilient pad.

19. An apparatus according to claim 14 wherein said carrier and said base are formed of a thermally conductive material in order to conduct heat generated by the disk drive to said base.

20. An apparatus according to claim 13 wherein said retention element is carried by said handle and is capable of operably contacting a surface of the disk drive opposite said carrier while said handle is in the second position such that the disk drive is snugly retained between said retention element and said carrier.

21. An apparatus according to claim 13 wherein said retention element comprises an angled lip capable of being grasped to move said handle from the second position to the first position.

22. An apparatus according to claim 13 further comprising an alignment feature on said carrier for cooperating with a corresponding alignment feature of the disk drive to align the disk drive with said carrier.

23. An apparatus according to claim 22 wherein said alignment feature comprises at least one alignment pin for engaging at least one respective hole defined by the disk drive.

24. An apparatus according to claim 13 further comprising at least one eating guide carried by said carrier for aligning the disk drive with said carrier.

25. A method for connecting a disk drive with an electrical circuit comprising:
  placing the disk drive upon a carrier while the carrier is in a disengaged position, placing the disk drive upon the carrier comprising mating corresponding alignment features of the disk drive and the carrier to align the disk drive with the carrier;
  moving the carrier from the disengaged position to an operable position in which the disk drive is connected with the electrical circuit; and
  retaining the disk drive on the carrier once the carrier has been moved to the operable position.

26. A method according to claim 25 wherein moving the carrier comprises slidably moving the carrier relative to a base.

27. A method according to claim 26 further comprising conducting heat generated by the disk drive during operation to the base via the carrier.

28. A method according to claim 25 wherein moving the carrier comprises moving a handle operably connected to the carrier from a first position to a second position in order to correspondingly move the carrier from the disengaged position to the operable position.

29. A method according to claim 28 wherein retaining the disk drive on the carrier comprises operably contacting a surface of the disk drive opposite the carrier with a retention element carried by the handle such that the disk drive is snugly retained between the retention element and the carrier.

30. A method according to claim 29 wherein retaining the disk drive on the carrier further comprises placing a cover over the disk drive and the carrier such that a contact member carried by the cover operably contacts at least one of the handle and the retention element in order to maintain the handle in the second position and the carrier in the corresponding operable position.

31. A method according to claim 25 wherein moving the carrier comprises limiting travel of the carrier to prevent over-insertion of the disk drive.

32. A method according to claim 25 wherein mating corresponding alignment features comprises mating at least one alignment pin carried by the carrier with at least one respective hole defined by the disk drive.

* * * * *

UNITED STATES PATENT AND TRADEMARK OFFICE
CERTIFICATE OF CORRECTION

PATENT NO.   : 6,532,150 B2
DATED        : March 11, 2003
INVENTOR(S)  : Sivertsen et al.

It is certified that error appears in the above-identified patent and that said Letters Patent is hereby corrected as shown below:

<u>Column 13,</u>
Line 35, "eating" should read -- seating --.

Signed and Sealed this

Thirteenth Day of May, 2003

JAMES E. ROGAN
*Director of the United States Patent and Trademark Office*